Dec. 17, 1957

F. W. WEAVER 2,816,622

HUMIDIFIER AND DUST COLLECTOR FOR
INTERNAL COMBUSTION ENGINES

Original Filed Nov. 13, 1956

2 Sheets-Sheet 1

INVENTOR.
Fred W. Weaver
BY Chas. Denegre
Attorney.

Dec. 17, 1957 F. W. WEAVER 2,816,622
HUMIDIFIER AND DUST COLLECTOR FOR
INTERNAL COMBUSTION ENGINES
Original Filed Nov. 13, 1956 2 Sheets-Sheet 2

INVENTOR.
Fred W. Weaver
BY Chas. Senegre
Attorney.

United States Patent Office 2,816,622
Patented Dec. 17, 1957

2,816,622

HUMIDIFIER AND DUST COLLECTOR FOR INTERNAL COMBUSTION ENGINES

Fred W. Weaver, Birmingham, Ala.

Original application November 13, 1956, Serial No. 621,616. Divided and this application May 20, 1957, Serial No. 660,738

2 Claims. (Cl. 183—25)

This invention relates to a humidifier and dust collector for internal combustion engines. It has for its main objects to provide such a device that will be highly satisfactory for the purpose intended, simple in structure, comparatively cheap to manufacture, easy to install for use, and extremely durable. It is especially intended for use on engines of automobiles and trucks, but is not limited to such use.

It is well known that if a slight amount of water is added to a gasoline-air mixture in the form of water vapor, a gasoline engine will not only run smoother, but will also have a greater output and a more ecconomical rate of fuel consumption. For this reason a gasoline engine will run better on a rainy day.

The present device is adapted to fit on the stack or air intake of a carburetor in the same manner as the generally used air cleaner and will require the same space, but will contain water instead of oil to thus form suitable contact of the incoming air with the water. Oil may be used if desired.

Other objects and advantages will appear from the drawings and description.

This application is a division of an application filed by the present applicant on November 13, 1956, under Serial Number 621,616.

Figure 1:
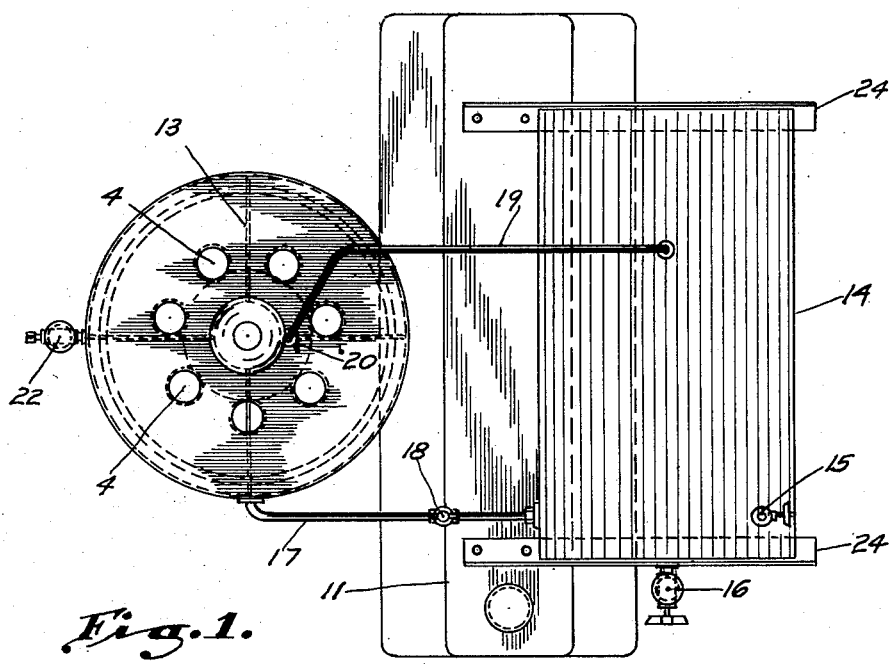
Figure 2:
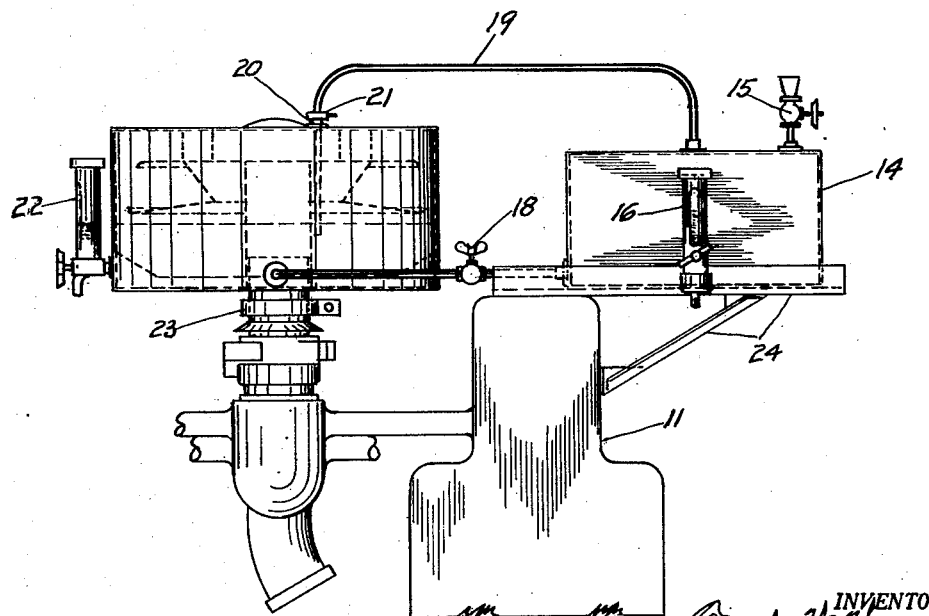
Figure 3:
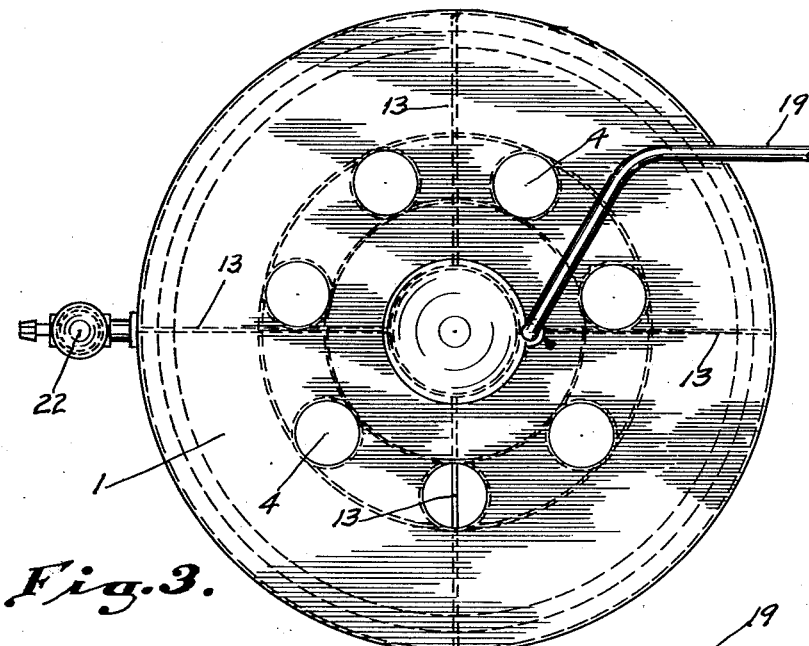
Figure 4:
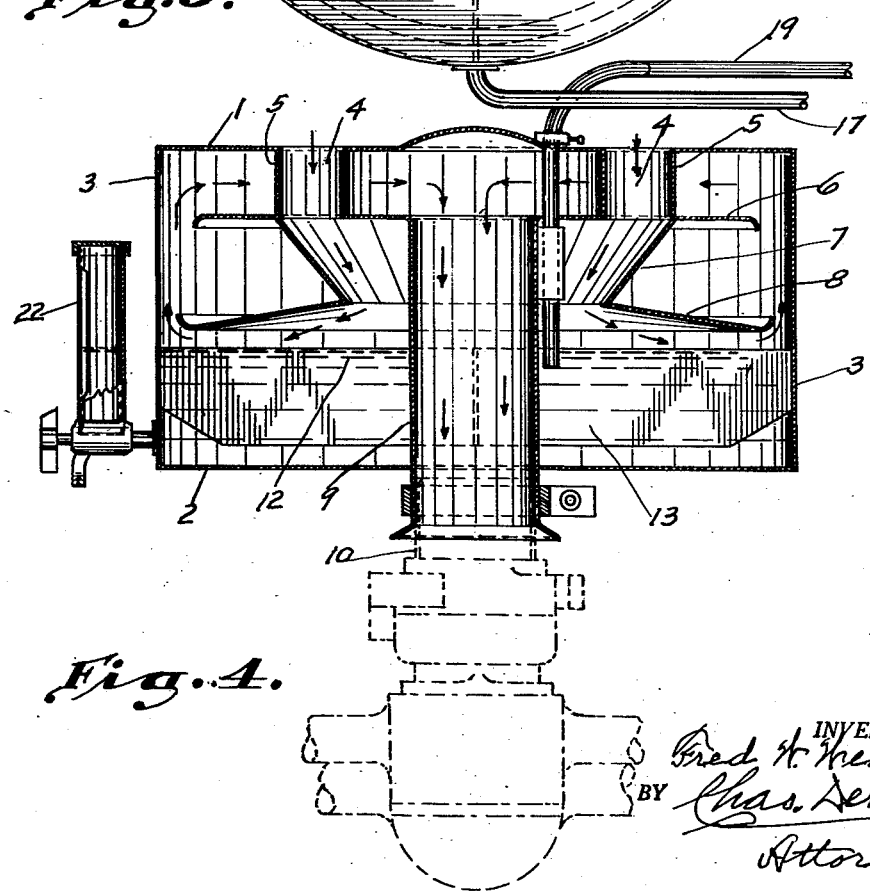

By referring generally to the drawings it will be observed that Fig. 1 is a top plan view showing a humidifier and dust collector made according to the present invention mounted for use on an internal combustion engine; Fig. 2 is a side elevational view of the parts shown in Fig. 1; Fig. 3 is an enlarged plan view of the device less the supply tank for the water source; Fig. 4 is a center elevational sectional view of the parts shown in Fig. 3.

Similar reference numerals refer to similar parts throughout the several views.

Referring to the drawings in detail it will be seen that the device comprises a round container having a top 1, bottom 2, and surrounding wall 3. A plurality of tubes 4 are attached in the top and extend downwardly into the container for a short distance. An air baffle structure consisting of parts 5, being the tubes positioned as a ring attached around in the upper portion, 6 being a circular plate with holes therethrough in which the lower ends of the tubes are attached, and having a large hole in its center, 7 being a slanting portion attached around at the lower edge of the tubes, and 8 being a circular plate attached to the lower edge of the slanting portion, all being positioned around tube 9 that is mounted on the intake stack opening of a carburetor 10 attached to a gasoline engine 11. The top 6 of the air baffle is provided with holes into which the lower ends of the tubes 4 are attached. Also it is provided with a curved downward outer edge for partly obstructing the travel of air to force it to pass between the curved edge and housing wall. The part 7 of the air baffle slants toward the main tube 9 so that the entering air will strike the main tube before making contact with the surface of the water 13 in the bottom portion of the container which is provided with water baffles 12 to prevent the water from sloshing around when the humidifier is used on the carburetor on an engine in an automobile or truck. The depth of the water in the container is regulated by vacuum as follows: the water supply tank 14 is air tight. It is provided with valve 15 for putting water therein to a desired depth as shown by the water gage 16 attached in a wall of the tank. A water supply tube 17 with a valve 18 leads from the bottom of a wall of the supply tank to the bottom of the wall of the container. An air tube 19 leads from the top of the water supply tank to the top of the container where it enters through a suitable hole 20 and extends downward into the water 13 in the container. The air tube 19 is provided with an adjustable collar 21 for regulating the depth of the end of the tube into the water. A water gage 22 is mounted on the wall of the container to show the desired depth of water in the container. Assuming that it is desired to put sufficient water in the container to have its surface near the bottom portion 8 of the air baffle, the air tube would be set to extend partly into the water as plainly shown in Figs. 2 and 4. In this condition with the valve on the connecting water supply tube open, water would flow from the full supply tank to the container until water in the container made contact with and closed the end of the air tube thereby cutting off the air supply to the water supply tank thus causing a vacuum in the top portion of the supply tank which would prevent water flowing out of it into the container. In this resulting condition the valve in the water supply tube could be closed to use the water in the container, or be open to let the vacuum arrangement control the water depth in the container. A clamping type band or collar 23 is used to hold the humidifier in place for use on the carburetor. A bracket structure 24 is used to support the water supply tank on the upper part of the engine.

The arrows shown in Fig. 4 show how sucked in air travels through the humidifier as follows: the air enters through the tubes in the top of the container, is diverted by the truncated cone portion of the air baffle toward the center main tube which it strikes, then the air flow curves and makes contact with the surface of the water and extends over the water to the outer curved edge of the baffle bottom portion, then upward along the inner face of the wall of the container, then along under the container top and between the tubes to the open end of the main center tube, then down through the center tube into the carburetor for use. Thus it will appear that as the air strikes the surface of the water and spreads out to the curved outer edge of the baffle it will absorb moisture from the water and be cleaned of dust and the like falling into the water. Also the said vacuum means connecting the water source to the humidifier may be used to regulate the space between the surface of the water and the outer curved edge of the baffle.

The various parts of the device may be made of any material suitable for the purpose, but I prefer to use good grades of metal such as copper and aluminum. Also the parts may be made in different sizes and capacities depending on the sizes of internal combustion engines on which to be used.

While I have shown and described the preferred embodiment of my invention, I do not wish to limit same to the exact and precise details of structure, and reserve the right to make all modifications and changes so long as they remain within the scope of the invention and the following claims.

Having described my invention I claim:

1. A humidifier and dust collector for cleaning air comprising, a round container, said container having a top and bottom and surrounding wall, said top having a plurality of same in size holes therethrough and spaced apart to form a circle, said bottom of the container having a comparatively large round hole through its center, a piece of tube attached by an end thereof in each of said circular positioned holes and extending downward into the container a short distance, a baffle structure in the container, said baffle structure having a round top portion and a bottom round portion and a truncated cone shaped portion connecting the top and bottom portions spaced apart, said top having a plurality of holes therethrough of a size and positioned to register with the plurality of holes in the container top, each lower end of said tube pieces being attached in a hole in the top of the baffle, said top and bottom of the baffle structure having their peripheral edges near the wall of the container as part of means for directing the travel of air through the structure, the top of the baffle having a hole through its center of a size to register with the said hole in the bottom of the container, the bottom of the baffle structure having a very large hole in its center portion with its inner edge attached to the bottom edge of said truncated cone shaped portion, a tube inserted through the holes in the center of the baffle structure and the hole in the container bottom, the top edge of the tube being attached to the edge of the center hole in the top of the baffle, the lower end portion of the tube extending through the hole in the bottom of the container with the center hole edge attached around the tube above its extended portion, a clamping type band mounted around the end of the tube that is out of the container, said tube end being of a size to fit upon the air intake stack portion of a carburetor on an internal combustion engine, a vacuum controlled water supply tank with an inlet valve in its top, said tank being mounted near the said humidifier structure, said vacuum control means comprising a water supply tube with a valve therein leading from the water supply tank to the container, an air tube leading from the water supply tank top to and into the top of the container with adjusting means on the air tube to regulate its depth into the container, a water gage mounted on the supply tank, a water gage mounted on the container, a water baffle in the lower portion of the container.

2. A humidifier and dust collector for cleaning air comprising, a housing having a body consisting of a top with a plurality of small holes therethrough and positioned circular, and a bottom with one comparatively large hole through its center, and surrounding wall, a plurality of short pieces of tube, said tubes being connected by an end of each in the holes in the top of the housing with the remainder of the tubes extending downward into the housing, an air baffle structure mounted in the upper half of the housing, said structure having a round top portion and a round bottom portion, and a truncated cone shaped portion connecting the top and bottom portions spaced apart, said baffle top having a plurality of small holes therethrough of a size and positioned to register with the holes in the housing top, and having a large hole through its center, the said tubes having their lower ends attached in the small holes in the top of the baffle, the said top of the baffle having its peripheral edge bent downward and positioned near the wall of the housing, the bottom of the baffle having its peripheral edge bent upward, and positioned very near the wall of the housing, said bottom baffle having a very large hole through its center with the edge of the hole attached to the lower edge of the truncated cone shaped portion, a main comparatively large tube positioned in the center hole in the top of the baffle and the hole in the bottom of the housing, the top edge of the tube being attached with its upper end flush in the center hole in the baffle top, the lower end of the tube being attached in the hole in the housing bottom with part of the tube extending out of the housing, a clamping type band and bolt therefor mounted around the end of the tube extending out of the housing, said tube end being of a size to fit upon the air inlet portion of a carburetor of an internal combustion engine, a water supply vacuum controlled tank mounted near the housing, said vacuum control means comprising a water supply tube with valve therein leading from the supply tank to the housing, an air tube leading from the top of the supply tank to and into the top of the housing with adusting means on the air tube to regulate its depth into the housing, an inlet valve for water mounted in the top of the supply tank, a water gage mounted on the water supply tank, a water gage mounted on the housing, said housing having a water baffle mounted in its bottom portion.

References Cited in the file of this patent
UNITED STATES PATENTS

| 1,771,814 | Osborn et al. | July 29, 1930 |
| 2,321,653 | Carlson | June 15, 1943 |
| 2,717,148 | Hall | Sept. 6, 1955 |

FOREIGN PATENTS

| 603,846 | Great Britain | June 24, 1948 |